(12) United States Patent
Howell et al.

(10) Patent No.: US 10,885,297 B2
(45) Date of Patent: Jan. 5, 2021

(54) NON-CONTACT CAPTURE DEVICE FOR CAPTURING BIOMETRIC DATA

(71) Applicant: GEMALTO SA, Meudon (FR)

(72) Inventors: Brett A. Howell, Ramsey, MN (US); Brian L. Linzie, Stillwater, MN (US)

(73) Assignee: THALES DIS FRANCE SA, Meudon (FR)

(*) Notice: Subject to any disclaimer, the term of this patent is extended or adjusted under 35 U.S.C. 154(b) by 0 days.

(21) Appl. No.: 16/323,426

(22) PCT Filed: Aug. 11, 2017

(86) PCT No.: PCT/EP2017/070526
§ 371 (c)(1),
(2) Date: Feb. 5, 2019

(87) PCT Pub. No.: WO2018/029377
PCT Pub. Date: Feb. 15, 2018

(65) Prior Publication Data
US 2020/0202101 A1    Jun. 25, 2020

Related U.S. Application Data

(63) Continuation-in-part of application No. 15/672,777, filed on Aug. 9, 2017, now abandoned.
(Continued)

(51) Int. Cl.
*G06K 9/00* (2006.01)
(52) U.S. Cl.
CPC ....... *G06K 9/00033* (2013.01); *G06K 9/0004* (2013.01); *G06K 9/00912* (2013.01); *G06K 9/00919* (2013.01)

(58) Field of Classification Search
CPC .......... G06K 9/00033; G06K 9/00919; G06K 9/0004; G06K 9/0091
See application file for complete search history.

(56) References Cited

U.S. PATENT DOCUMENTS

2002/0106115 A1* 8/2002 Rajbenbach ....... G06K 9/00013
382/126
2004/0228506 A1* 11/2004 Haddad .............. G06K 9/00013
382/124
(Continued)

FOREIGN PATENT DOCUMENTS

| EP | 1216451 B1 | 8/2003 |
| EP | WO0122349 B1 | 8/2003 |
| WO | WO2007050776 A2 | 5/2007 |

OTHER PUBLICATIONS

PCT/EP20171070526, International Search Report, dated Oct. 11, 2017, European Patent Office, P.B. 5818 Patentlaan 2 NL—2280 HV Rijswijk.
(Continued)

*Primary Examiner* — Abhishek Sarma
(74) *Attorney, Agent, or Firm* — The Jansson Firm; Pehr B. Jansson (57) ABSTRACT

The non-contact capture device allows for an image of an object to be captured when the object is not making contact with any portion of the non-contact capture device. The non-contact capture device comprises an electronic compartment comprising a camera and a light source, wherein the camera and light source are directed to an image capture region, a housing guide comprising a leg extending away from the electronic compartment to support a collar, and an image capture region spaced away from the electronic compartment and the housing guide. The collar extends laterally around only a portion of the image capture region forming an entry gap into the image capture region.

24 Claims, 8 Drawing Sheets

Related U.S. Application Data (60) Provisional application No. 62/410,911, filed on Oct. 21, 2016, provisional application No. 62/396,441, filed on Sep. 19, 2016, provisional application No. 62/373,601, filed on Aug. 11, 2016.

(56) References Cited

U.S. PATENT DOCUMENTS

| | | | |
|---|---|---|---|
| 2008/0049981 A1* | 2/2008 | Nagasaka | G06K 9/00013 382/115 |
| 2011/0169934 A1 | 7/2011 | Pulluru et al. | |
| 2012/0076369 A1 | 3/2012 | Abramovich et al. | |
| 2015/0130917 A1* | 5/2015 | Mil'shtein | G06K 9/00033 348/77 |
| 2018/0046840 A1* | 2/2018 | Howell | H04N 7/188 |

OTHER PUBLICATIONS

PCT/EP2017/070526, Written Opinion of the International Searching Authority, dated Oct. 11, 2017, European Patent Office, P.B. 5818 Patentlaan 2 NL—2280 HV Rijswijk.

PCT/EP2017/070526, International Search Report, dated Oct. 11, 2017, European Patent Office, P.B. 5818 Patentlaan 2 NL—2280 HV Rijswijk.

* cited by examiner

NON-CONTACT CAPTURE DEVICE FOR CAPTURING BIOMETRIC DATA

FIELD

The present disclosure relates to a non-contact capture device for capturing biometric data, such as fingerprints and palm prints.

BACKGROUND

Readers or capture devices are used to capture an image and specifically are used to capture biometric information, such as fingerprints. Commonly, a biometric capture device includes a surface that a user will place his or her hand on, and then the biometric capture device captures the image of the hand. The surface allows for precise spacing of the hand relative to the components that capture the image so that clear and accurate images are obtained. However, for biometric capture devices, requiring a user to make contact with a surface can introduce oils onto the surface that must be removed before subsequent images are captured. Further, when a user makes contact with the surface, viruses, bacteria, or other pathogens from that user can be transferred to the surface. Again, the surface then will require cleaning to prevent the spread of those viruses, bacteria, or pathogens to other users.

SUMMARY

A non-contact capture device is able to capture images without the object that is being imaged making contact with a surface during the image capture. In particular, a non-contact biometric capture device for capturing images allows a user to position his or her body, such as a foot or hand, away from any surface for an image to be captured. However, precise placement of the hand relative to the image capture device is needed.

The non-contact capture device allows for an image of an object to be captured when the object is not making contact with any portion of the non-contact capture device. In one embodiment, the non-contact capture device comprises an electronic compartment comprising a camera and a light source, wherein the camera and light source are directed to an image capture region, a housing guide comprising a leg extending away from the electronic compartment to support a collar, and an image capture region spaced away from the electronic compartment and the housing guide. The collar extends laterally around only a portion of the image capture region forming an entry gap into the image capture region.

In one embodiment, the housing guide comprises a first leg and a second leg, each on opposing portions of the electronic compartment. In one embodiment, the housing guide further comprises a rear shield, extending from the electronic compartment to the collar and between the first leg and the second leg. In one embodiment, the collar extends beyond the first leg and the second leg. In one embodiment, the collar extends at least 90 degrees and less than 360 degrees circumferentially around the image capture region. In one embodiment, the collar extends at least 180 degrees and less than 300 degrees circumferentially around the image capture region. In one embodiment, the collar includes a guide surface that extends in a plane that is co-planar with the image capture region. In one embodiment, the guide surface includes a color that is different than a color of the remaining portion of the collar. In one embodiment, the collar comprises a sloping surface that slopes down towards the image capture region. In one embodiment, the guide surface includes a color that is different than a color of the sloping surface of the collar.

In one embodiment, the device comprises a placement indicator comprising a sensor for detecting placement of an object to be imaged within the image capture region and an output for signaling correct placement of the object to be imaged within the image capture region. In one embodiment, the output is a flashing colored light. In one embodiment, the output is an audio signal. In one embodiment, the output is an image icon.

In one embodiment, the device further comprises an object to be imaged for placement into the image capture region. In one embodiment, the object is one friction ridge surface of a user. In one embodiment, the friction ridge is one of a finger pad, thumb, palm, or foot.

In one embodiment, the device further comprises an infrared sensor, wherein when the infrared sensor detects the presence of an object in the image capture region, the infrared sensor triggers the light source and the camera. In one embodiment, when the light source is triggered, the infrared sensor is deactivated. In one embodiment, when the camera is triggered, the camera captures more than one image of an object in the image capture region.

In one embodiment, the device further comprises a transparent surface disposed between the electronics compartment and the image capture region.

In one embodiment, the device further comprises a second camera, wherein the first camera is positioned to capture an image of a first portion of an object to be imaged, and wherein the second camera is positioned to capture a second portion of the object to be imaged.

In one embodiment, the device further comprises a communications module, wherein the communications module communicates with an exterior processor. In one embodiment, the exterior processor triggers the light source and the camera.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Figure 1A:
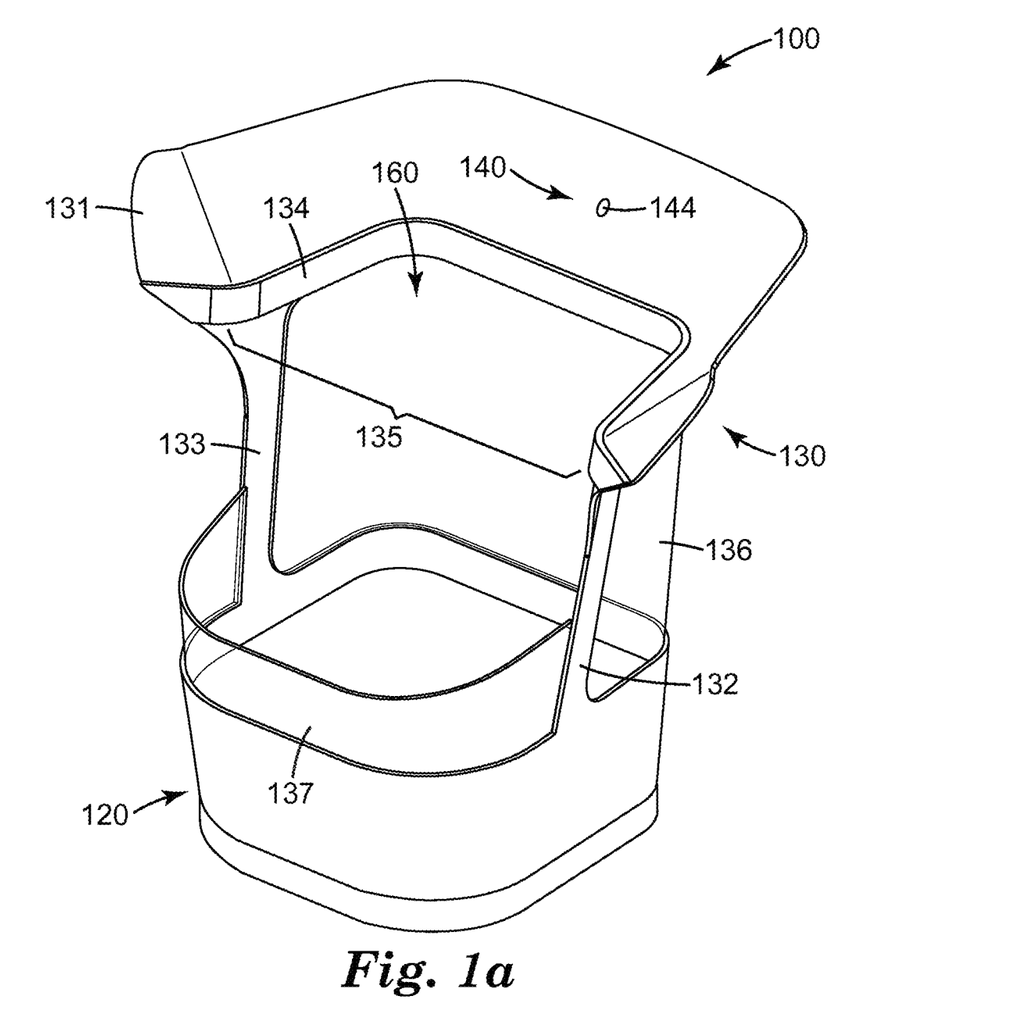
FIG. 1a is a perspective view of one embodiment of a non-contact capture device.
Figure 1B:
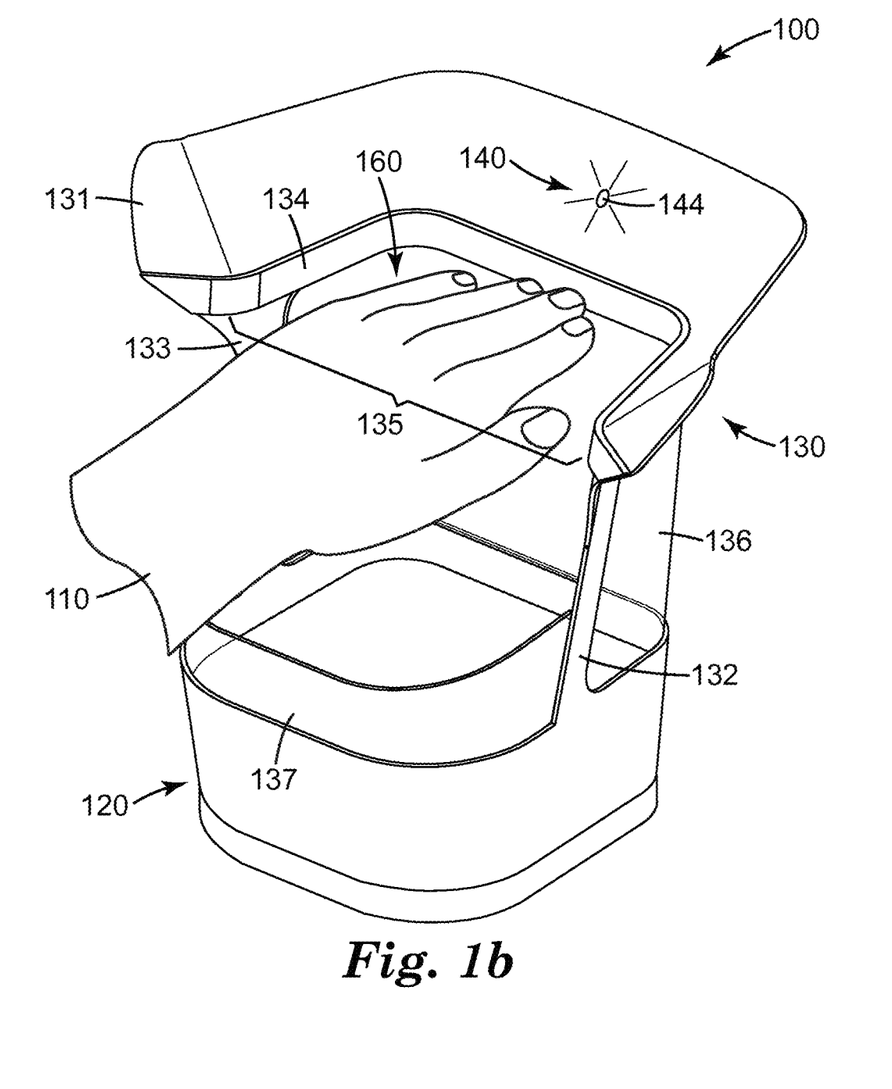
FIG. 1b is a perspective of the non-contact capture device of FIG. 1 with a user's hand in the image capture region.

FIG. 1a is a perspective view of one embodiment of a non-contact capture device 100 and FIG. 1b is a perspective of the non-contact capture device 100 of FIG. 1 with a user's hand 110 in the image capture region 160.

The non-contact capture device 100 comprises an electronic compartment 120, a housing guide 130, and an image capture region 160. The electronic compartment 120 will be described in more detail below and references FIG. 2. The user's hand 110 (or other appendage, such as a finger, palm, foot, or other object) should not make contact with the collar 131, legs 132, 133, or the electronic compartment 120. In one embodiment, the user's hand 110 should not make contact with any portion of the non-contact capture device 100. The user's hand 110 may be positioned in a variety of way with respect to non-contact capture device 100. For instance, the user's hand may be both flat and level with the capture. In other examples, the user's hand may be positioned in a way that is other than flat and level. In some examples, the user's hand may not contact with entry guard 137.

The housing guide 130 comprising at least one leg, and in the embodiment shown in FIGS. 1a and 1b the housing guide 130 comprises a first leg 132 and a second leg 133. The legs 132, 133 are outside of the image capture region 160 and extending away from the electronic compartment 120 to support a collar 131. In the embodiment shown in FIGS. 1a and 1b, the first leg 132 and a second leg 133 are each on opposing portions of the electronic compartment 120.

The image capture region 160 is spaced away from the electronic compartment 120 and the housing guide 130. The image capture region 160 is the position where the camera within the electronic compartment 120 captures images. Ideal placement of the image capture region 160 relative to the camera's capabilities will result in the highest quality images captured.

The collar 131 extends laterally around only a portion of the image capture region 160 forming an entry gap 135 into the image capture region 160. The collar 131 provides a visual indicator for estimating placement of the object (i.e., user's hand) 110 into the image capture region 160, while preventing the object from extending too far away from the image capture region 160. The entry gap 135 allows a user to easily place an object into the image capture region 160. The collar 131 is supported by the leg, and in the embodiment shown in FIGS. 1a and 1b, by both legs 132, 133. Therefore, the collar 131 is spaced longitudinally away from the electronic compartment 120. In one embodiment, the collar 160 extends at least 90 degrees and less than 360 degrees circumferentially around the image capture region 160 creating the entry gap 135. In one embodiment, the collar 131 extends at least 180 degrees and less than 300 degrees circumferentially around the image capture region 160 creating the entry gap 135. The length of the legs 132, 133, and therefore, placement of the collar 131 is designed such that the collar is adjacent to the image capture region 160. The circumferential placement of the collar 131 provides a barrier for a user to place the object too far away from the image capture region 160.

In one embodiment, like as shown in FIGS. 1a and 1b the collar 131 extends beyond the first leg 132 and the second leg 133. This design allows a user to place an object 110, like a hand into the image capture region 160, while other portions of the object 110 extend outside of the image capture region 160 without unduly interfering with the legs 132, 133. For example, a user could place their thumb into the image capture region 160 on, while their fingers extend outside of the image capture region 160.

In one embodiment, the collar 131 includes a guide surface 134 that provides a visual indicator for estimating placement of the object 110 into the image capture region 160. In one embodiment, the guide surface 134 forms a plane. The plane of the guide surface 134 may be above, below, or coplanar with image capture region 160. In one embodiment, the object 110 is placed adjacent to the plane formed by the guide surface 134. In one embodiment, the object 110 is placed centric, just above or just below the plane formed by the guide surface 134. In one embodiment, the guide surface 134 includes a color that is different than a color of the remaining portion of the collar.

In some examples, guide surface 134 is positioned within an area bordered by the collar. In some examples, guide surface 134 is co-planar with the capture area and nearer to the capture area than the collar. In some examples, the collar and the guide may be attached closely to each other (e.g., within a defined distance), or there may be a gap of a defined distance between them with support structures connecting them. Example defined distances may be within the range of 1-15 cm.

In one embodiment, like shown in FIGS. 1a and 1b, the collar 131 comprises a sloping surface than slopes down towards the image capture region 160. The sloping surface of the collar 131 provides a visual indicator for estimating placement of the object 110 into the image capture region 160.

To provider further enclosure and protection of the electronic compartment 120, the housing guide 130 of the device further comprises a rear shield 136, extending from the electronic compartment 120 to the collar 131 and between the first leg 132 and the second leg 133. In one embodiment, the rear shield 136 is transparent. In one embodiment, the read shield 136 is opposite to the entry gap 135.

To provide further protection of the electronic compartment 120, the device 100 further comprises an entry guard 137 extending up from the electronic compartment 120. In the embodiment shown in FIGS. 1a and 1b, the entry guard 137 extends partially up from the electronic compartment and sufficiently below the gap 135 and the image capture region 160 to still allow easy placement of the object 110 in the image capture region 160. In the embodiment shown in FIGS. 1a and 1b, the entry guard 137 extends from the first leg 132 to the second leg 133.

In one embodiment, the non-contact capture device 100 further comprises a placement indicator 140 for guiding placement of an object 110 into the image capture region. In one embodiment, the placement indicator 140 comprises a sensor 228 (described below) for detecting placement of the object 110 to be imaged within the image capture region 160 and an output 144 for signaling correct placement of the object 110 to be imaged within the image capture region 160. For example, the output 144 may be a flashing colored light and when the object 110 is present in the image capture region 160 the flashing colored light changes either the rate of flashing or the color, or both. The guide surface 134 may also be configured to provide output as described. For example, the output 144 may be be an audio signal change.

For example, the output may be an image icon. An appropriate image icon may provide the visual instruction to the user for each step of the image collection process. For example, the image icon may first show a right hand, then a left hand, then the user's thumbs to be captured in the image capture region. In some examples, placement indicator 140 may be a display device such as a graphical display device that presents images and/or moving images, such as video. Images and/or moving images may include text, symbols, or any other graphical elements.

Figure 2:
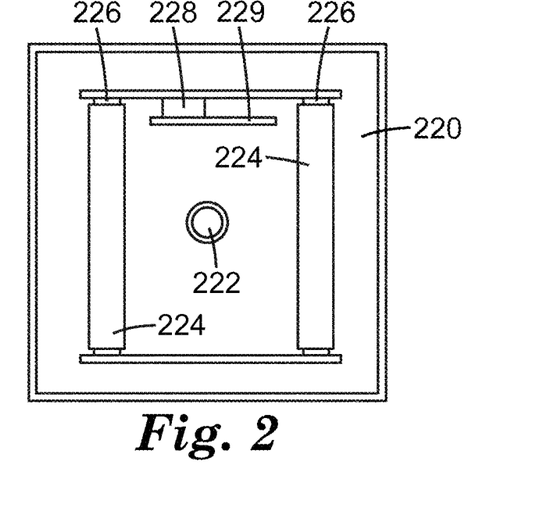
FIG. 2 is the electronic compartment of one embodiment of a non-contact capture device.

FIG. 2 shows the electronic compartment 220 of a non-contact capture device. Electronic compartment 220 as shown in FIG. 2 is an exemplary arrangement of various electronic components that may be included in a non-contact capture device. Other components may be used in various combinations, as will be apparent upon reading the present disclosure. Electronic compartment 220 includes camera 222. Camera 222 may include a lens and an image or optical sensor. In the illustrated embodiment, camera 222 may be a high-resolution camera for a desired field of view. Other factors for selecting camera 222 may include the particular lens and imaging sensor included in camera 222, the sensitivity of the camera to particular wavelengths of light, and the size and cost of the camera.

Electronic compartment 220 further includes light sources 226. In the illustrated embodiment, light sources are light emitting diodes (LED's) that emit light peaking in the blue wavelength. For example, the peak wavelength of emitted light may be in the range of 440 to 570 nanometers (nm). More specifically, the peak wavelength of emitted light may be in the range of 460 to 480 nm. Human skin has been found to have higher reflectivity in the green and blue portions of the visible light spectrum, thus emitting light with wavelengths peaking in the blue and green portions of the visible light spectrum can help to more clearly illuminate details on a friction ridge surface of a user's hand. Light sources 226 may be paired with passive or active heatsinks to dissipate heat generated by light sources 226. In this instances, light sources are illuminated for a relatively short period of time, for example, ten (10) milliseconds or less, and as such, a passive heatsink is adequate for thermal dissipation. In other instances, where light sources 226 that generate more heat are used, or where light sources 226 are illuminated for a longer periods of time, one of skill in the art may choose a different type of heatsink, such as an active heatsink.

Camera 222 may be chosen in part based on its response to light in a chosen wavelength. For example, in one instance, the device described herein uses a five megapixel (5 MP) camera because of its optimal response in the blue wavelength. In other configurations, other wavelengths of light may be emitted by light sources 226, and other types of cameras 222 may be used.

Light emitted by light sources 226 may be of varying power levels. Light sources 226 may be, in some instances, paired with light guides 224 to direct the output of light sources 226 to direct the emitted light toward the image capture region 160. In one instances, light guides are made of a polycarbonate tube lined with enhanced specular reflector (ESR) film and a turning film. In some instances, light guides 224 may collimate the emitted light. The collimation of light aligns the rays so that each is parallel, reducing light scattering and undesired reflections. In other instances, light guides 224 may direct the output of light sources 226 toward the image capture region such that the rays of light are generally parallel. A light guide 224 may be any applicable configuration, and will be apparent to one of skill in the art upon reading the present disclosure. Further, electronics compartment 222 may include a single light guide 224, multiple light guides 224 or no light guides at all.

A sensor 228 includes an emitter and a sensor that detects reflection from the emission to determine if an object is in the image capture region. In one embodiment the sensor 228 is an infrared (IR) sensor 228, which includes both an infrared emitter that emits infrared light into image capture region 160 and a sensor component that detects reflections of the emitted infrared light. IR sensor 228 can be used to determine whether an object of interest, such as a hand, has entered the field of view of the camera 222, and therefore the image capture region 160. The device described herein may include a single or multiple IR sensors 228. This IR sensor 228 may function with the placement indicator 140.

Controller 229 may be a microcontroller or other processor used to control various elements of electronics within electronic compartment 220, such as IR sensor 228, light sources 226, and camera 222. Controller 229 may also control other components not pictured in FIG. 2, including other microcontrollers. Other purposes of controller 229 will be apparent to one of skill in the art upon reading the present disclosure.

Figure 3:
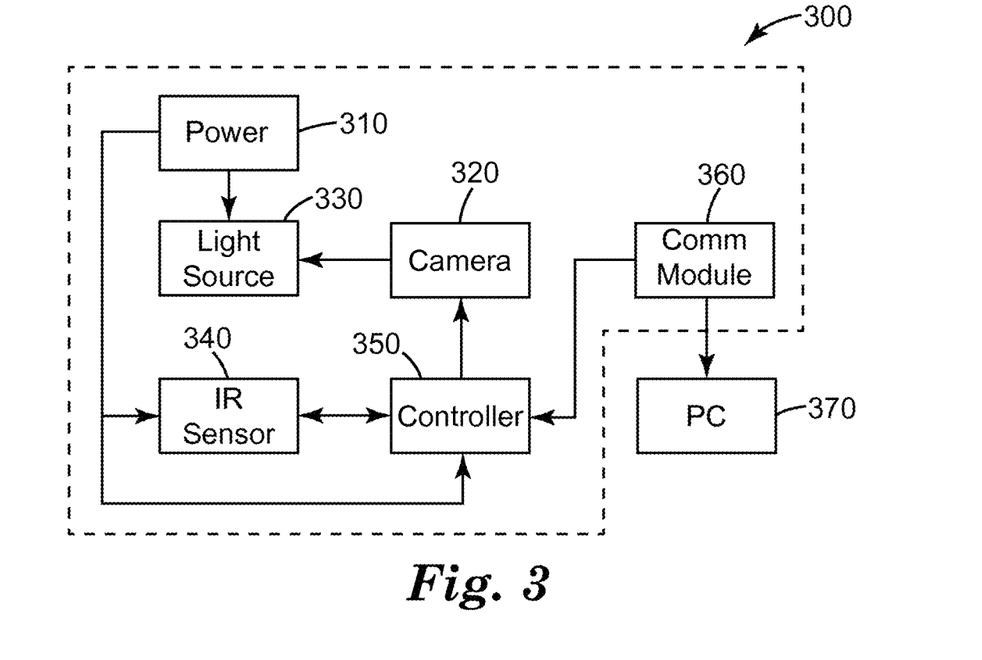
FIG. 3 is a block diagram of one embodiment of a non-contact capture device.

FIG. 3 is a block diagram of a non-contact capture device 300, it is understood that device 300 may include housing guide 130, such as described above. Device 300 includes power source 310. Power source 310 may be an external power source, such as a connection to a building outlet, or may be an internal stored power source 310, such as a battery. In one instance, power source 310 is a 12V, 5 A power supply. Power source 310 may be chosen to be a limited power source to limit the exposure or voltage or current to a user in the case of electrical fault. Power source 310 provides power, through voltage regulators, to light source 330, camera 320, IR sensor 340, controller 350 and communications module 360.

Infrared sensor 340 is powered by power source 310 and controlled by controller 350. In some instances, IR sensor 340 may be activated by controller 350. When IR sensor 340 is first activated by controller 350, it is calibrated, as discussed in further detail herein. After calibration, when an object enters the field of view of the IR sensor 340, it generates an increased signal from the sensor, and if the increased signal exceeds a predetermined threshold, controller 350 triggers light source 330 and camera 320. An example of an object entering the field of view of IR sensor is a finger, thumb or hand of a user.

Controller 350 is used for a variety of purposes, including acquiring and processing data from IR sensors 340, synchronizing light source 330 flashes and camera 320 exposure timings, and toggling IR sensors 340 during different stages of image acquisition. Controller 350 can interface with communications module 360 which is used to communicate with external devices, such as an external personal computer (PC), a network, the Cloud, or other electronic device. Communications module may communicate with external devices in a variety of ways, including using WiFi, Bluetooth, radio frequency communication or any other communication protocol as will be apparent to one of skill in the art upon reading the present disclosure.

Upon power up of the non-contact capture device 300, controller 350 runs a calibration routine on the IR sensors 340 to account for changes in the IR system output and ambient IR. After calibration, the microcontroller enters the default triggering mode, which uses the IR sensors. In the default triggering mode, the camera 320 and light source 330 are triggered in response to IR sensor 340 detecting an object in its field of vision. When using IR sensor triggering, the microcontroller acquires data from the sensors, filters the data, and if a threshold is reached, acquires an image of an object, such as a friction ridge surface in the image capture region 160.

In a second triggering mode, the camera 320 and light source 330 may be triggered based on commands sent from an internal device, such as a PC or other electronic device, and received by the communication module 360, and sent to controller 350. In the second triggering mode, the device then acquires an image, and the image may be processed and displayed on a user interface in the PC or other external device.

During the process of image capture, when light source 330 is emitting light and/or when camera 320 is capturing an image, the microcontroller disables the IR sensors 340. The IR sensors 340 are disabled to prevent extraneous IR light from hitting the camera 320. The IR sensors are disabled for the duration of the image acquisition process. After the IR sensors are disabled, the light source 330 is activated and the camera 320 is triggered. In some instances, the light source 330 is activated for the duration of image acquisition. After camera exposure completes, the IR sensors 340 are activated and the light source 330 is deactivated.

The output of the non-contact capture device may vary, depending on the lighting and camera choices. In one instance, the output of the friction ridge capture device may be a grayscale image of the friction ridge surface. In some instances, when the camera captures the image of at least one friction ridge surface on a user's hand, the image is a picture of the user's fingers, or a finger photo. The image may then be processed by controller 350 or by an external processor to create a processed fingerprint image where the background behind the hand or fingers is removed and the friction ridges or minutiae are emphasized.

In some instances, the camera 320 may be configured to optimally photograph or capture an image of a user's hand. For example, in some cases the camera may use an electronic rolling shutter (ERS) or a global reset release shutter (GRRS). GRRS and ERS differ in terms of when the pixels become active for image capture. GRRS starts exposure for all rows of pixels at the same time, however, each row's total exposure time is longer than the exposure time of the previous row. ERS exposes each row of pixels for the same duration, but each row begins that row's exposure after the previous row has started. In some instances, the present disclosure may use GRRS instead of ERS, in order to eliminate the effects of image shearing. Image shearing is an image distortion caused by non-simultaneous exposure of adjacent rows (e.g. causing a vertical line to appear slanted). Hand tremors produce motion that can lead to image shearing. Therefore, GRRS can be used to compensate for hand tremors and other movement artifacts. To counteract the blurring may occur with GRRS, the illumination shield reduces the effects of ambient light.

Figure 4:
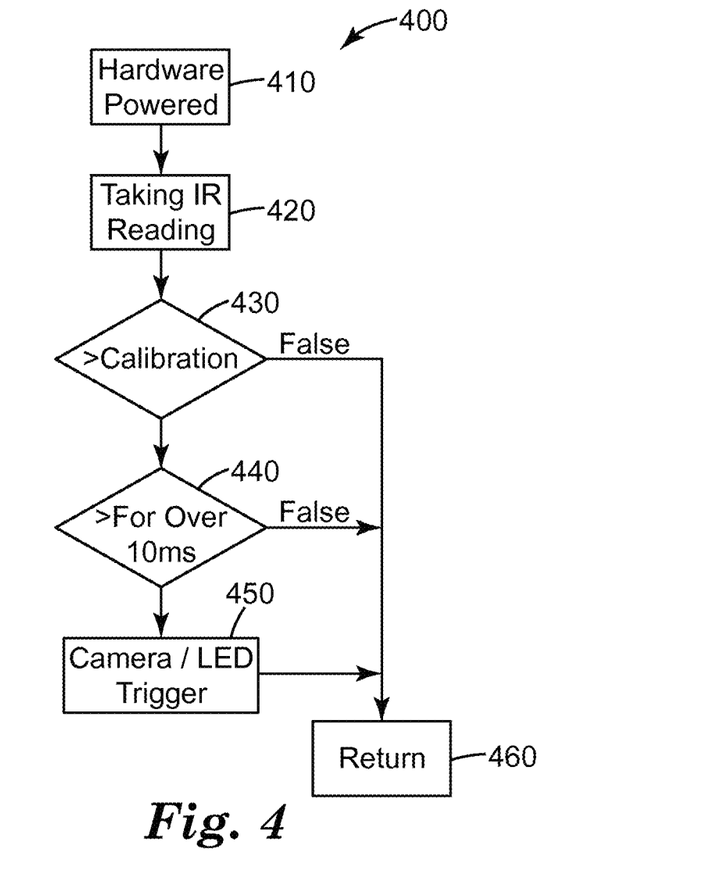
FIG. 4 is a flow chart for triggering the camera and light source of one embodiment of a non-contact capture device.

FIG. 4 is a flow chart 400 for triggering the camera and light source of a non-contact capture device. In step 410, the device hardware is powered. The device may be powered by a user flipping a switch or otherwise interacting with a user interface or input option with the device. The device may alternately or also be powered through a command from an external device, such as a PC, in communication with the device.

After the device is powered, in step 420, the IR sensors take an initial IR reading.

In step 430, the IR sensors are calibrated by measuring the unobstructed view from the sensors and creating an averaged baseline. If calibration is not completed, or is "false", the device returns to step 420. To prevent the baseline from losing accuracy, the baseline is updated at a regular interval to compensate for thermal drift and changing ambient conditions.

Once calibration in step 430 is completed, the device takes further IR readings at regular intervals to detect deviation from the calibrated baseline in step 440. If the IR readings indicate an increased IR reading for a period of time over 10 milliseconds, the camera and light source are triggered. If the increased IR reading lasts for less than 10 milliseconds, the device returns to step 420.

In step 450, the camera and light source are triggered to capture an image of the user's hand. After the image is captured, the device returns to step 420.

Flow chart 400 shows an exemplary method for triggering the camera and light source using IR sensors. Other methods for triggering the camera and light source will be apparent to one of skill in the art upon reading the present disclosure, for example, manually triggering the camera and light source, or using other sensors, such as a motion sensor or ultrasonic sensor to trigger the camera and light source.

Figure 5A:
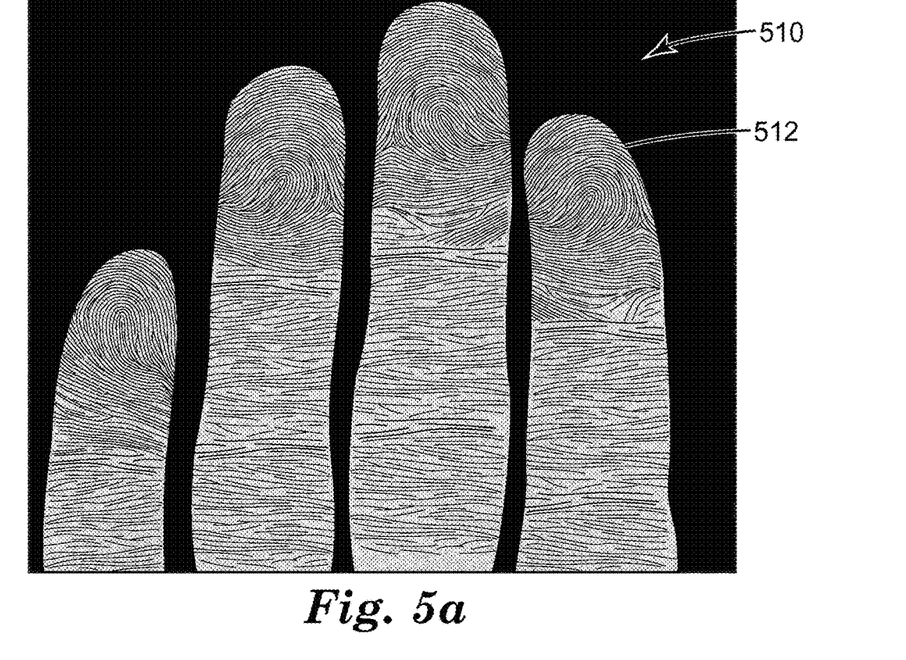
FIGS. 5a and 5b show captured images of before and after processing, respectively.
Figure 5B:
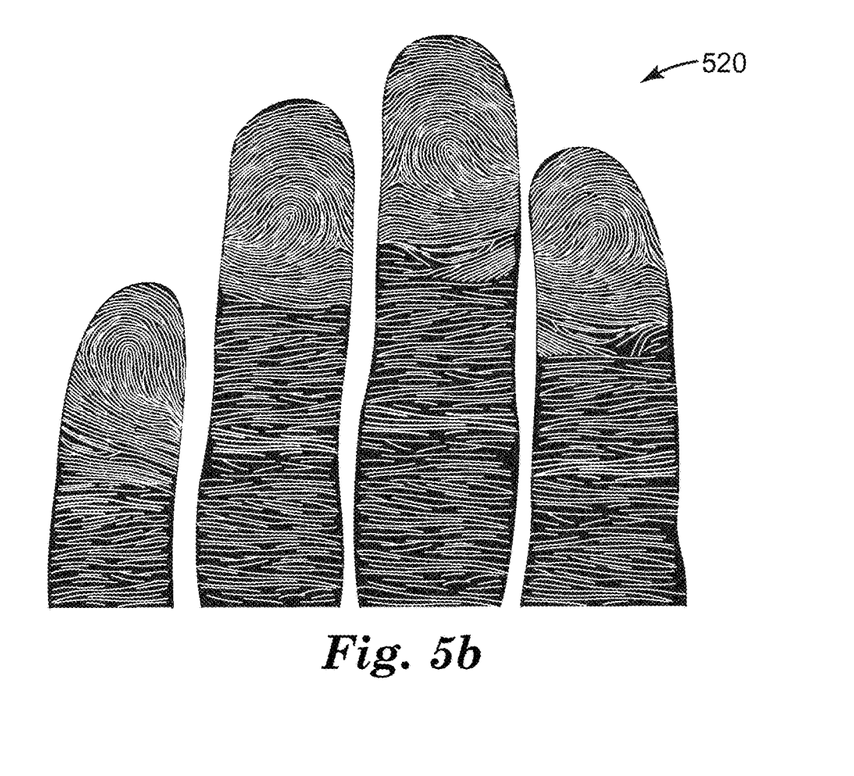

FIGS. 5a and 5b show captured images of a friction ridge surface before and after processing, respectively. FIG. 5a is a finger photo 510. It is an unprocessed image of at least one friction ridge surface on a user's hand as captured by camera of the non-contact friction ridge surface capture device. FIG. 5a includes friction ridge surfaces, in this instance, fingers 512.

In some instances, the non-contact capture device may also process the image, such as the one shown in FIG. 5a, to generate output shown in FIG. 5b. FIG. 5b shows a processed fingerprint image 520. In processed fingerprint image 520, the background has been removed from friction ridge surfaces. The friction ridge surfaces 525 have undergone image processing to highlight friction ridges and minutiae. In some instances, this processing may be completed locally by a controller in the non-contact capture device. In some other instances, this additional processing may be completed by a device or processor external to the non-contact capture device. Both types of images as shown in FIGS. 5a and 5b may be stored as part of a record in a database, and both may be used for purposes of identification or authentication.

Figure 6:
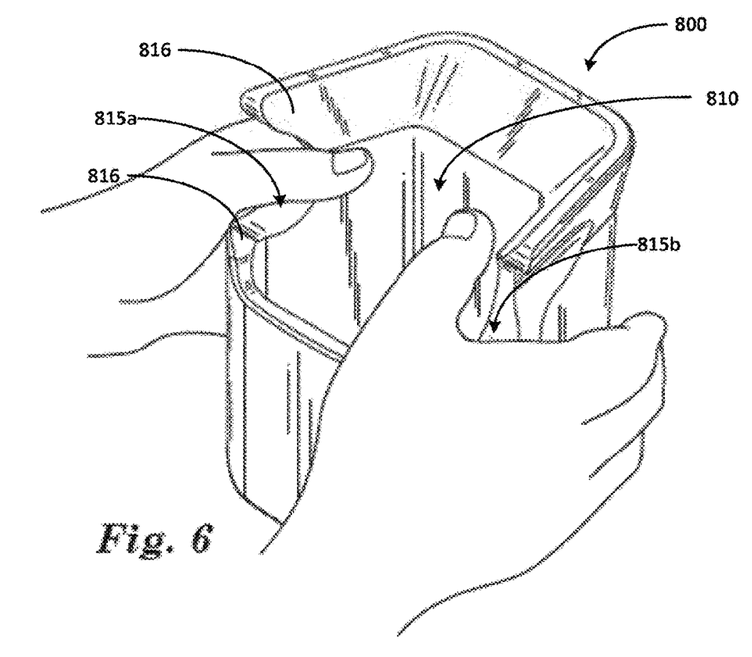
FIG. 6 is a perspective view of one embodiment of a non-contact capture device 800 with a user's thumbs in an image capture region.
Figure 7:
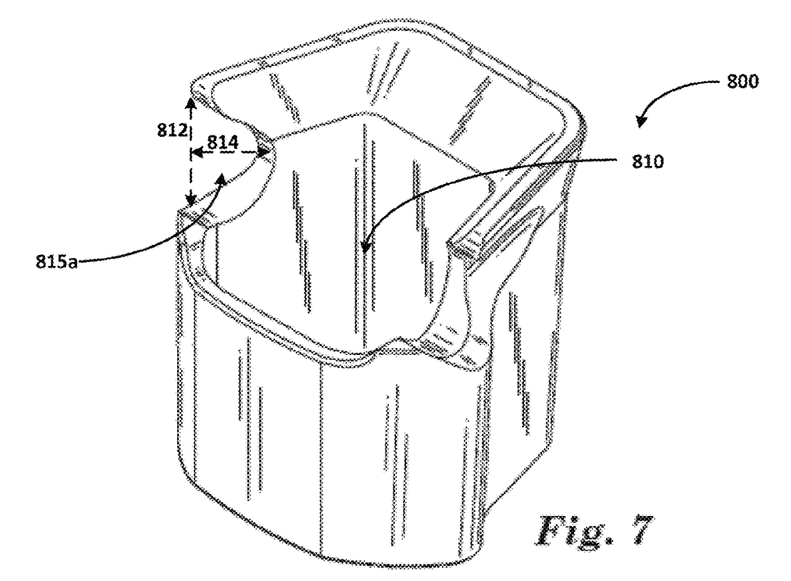
FIG. 7 is a perspective of the non-contact capture device 800 of FIG. 1 without a user's thumbs in an image capture region.

FIG. 6 is a perspective view of one embodiment of a non-contact capture device 800 with a user's thumbs in image capture region 810 and FIG. 7 is a perspective of the non-contact capture device 800 of FIG. 6 without a user's thumbs in the image capture region 810. Non-contact capture device 800 of FIGS. 6-7 may include similar or the same functionality as other non-contact capture devices described in FIGS. 1-5. As shown in FIG. 6, non-contact capture device 800 may include recesses 815a-815b ("recesses 815"). In some examples, recesses 815 may be indentations or voids in non-contact capture device 800. For instance, recesses 815 are shown as a void or indentation formed partially in collar 816, and partially in body 816 (which may be a continuous structure or alternatively legs, such as legs 132, 133 in FIGS. 1a-1b). In some examples, recesses 815 are voids or indentations formed completely in collar 816 or completely in body 816. In some examples, recesses 815 are semi-circle shaped as shown in FIGS. 6-7, while in other examples, recesses 815 may be any suitable shape. As shown in FIG. 6, a user may place his or her thumbs into the recesses, such that images of the thumbs may be read in image capture region 810.

FIG. 7 illustrates the dimensions of recess 815a as y-dimension 812 and x-dimension 814. For instance, y-dimension 812 may represent a height of recess 815a and x-dimension 814 may represent a depth of recess 815a. x-dimension 814 and y-dimension may be any suitable distance. In some examples, the distance of each dimension may be in a range of 0.5 inches to 4 inches.

Figure 8A:
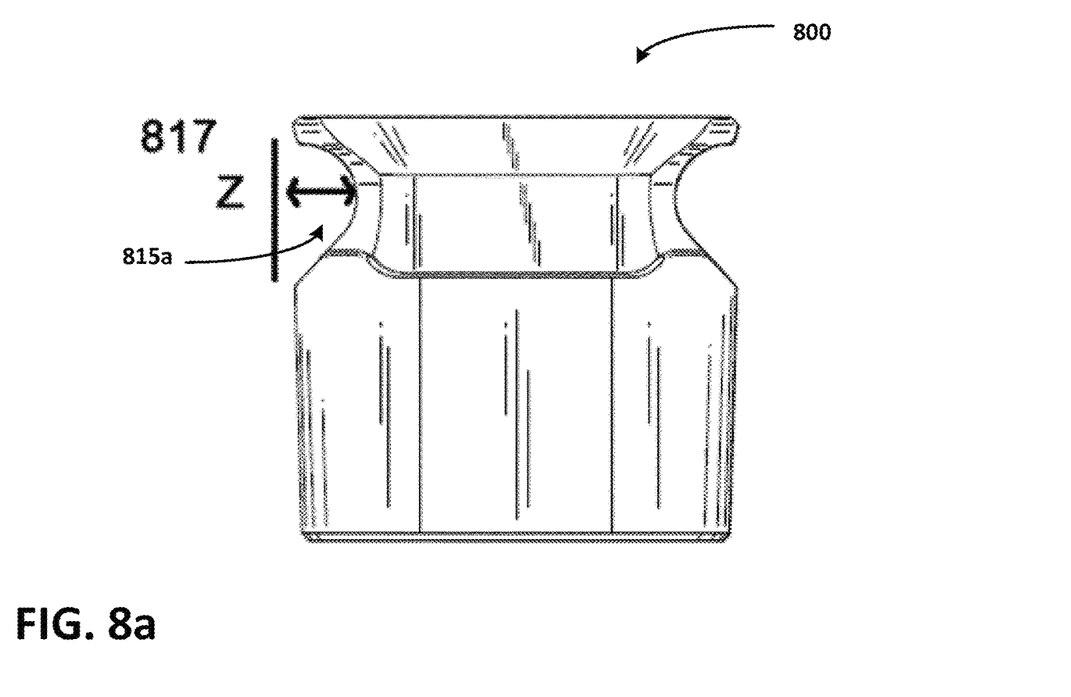
FIG. 8a is a front view of one embodiment of a non-contact capture device illustrating a z-dimension of a recess.
Figure 8B:
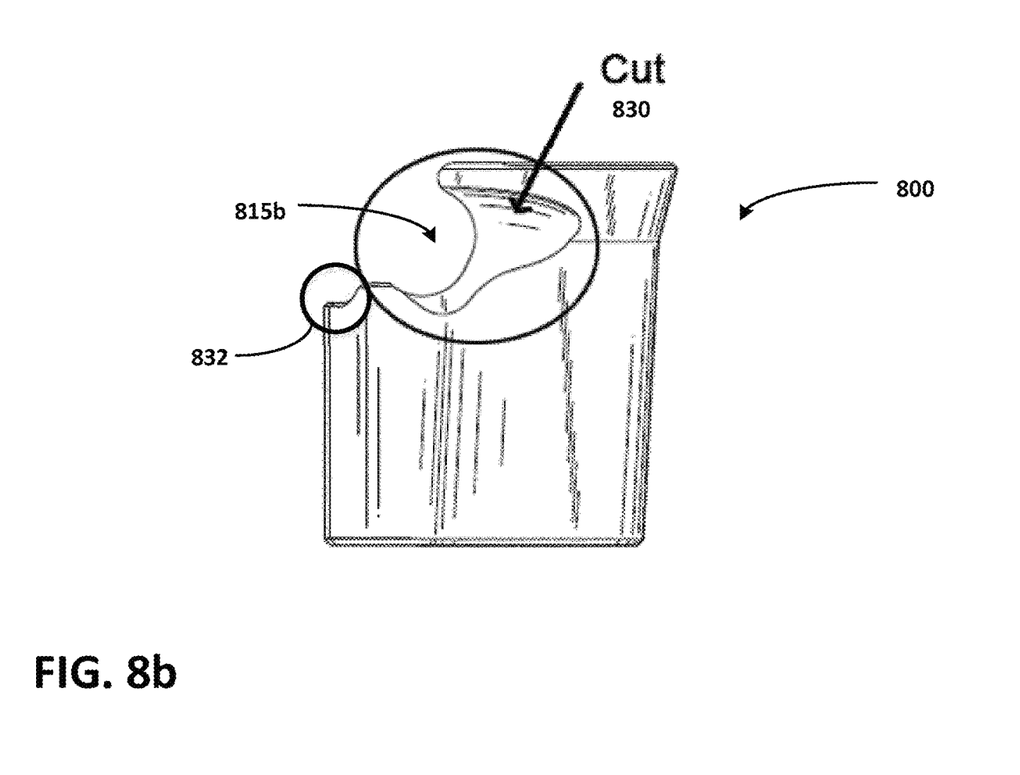
FIG. 8b is a side view of a non-contact capture device with a cut.
Figure 9A:
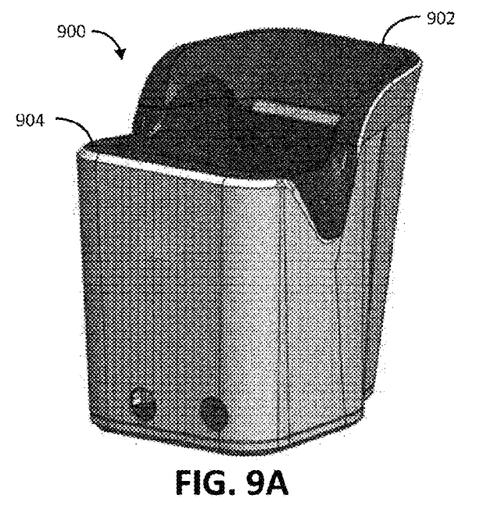
FIGS. 9A-9D illustrate perspective views of a non-contact capture device with a detachable collar and base.
Figure 9B:
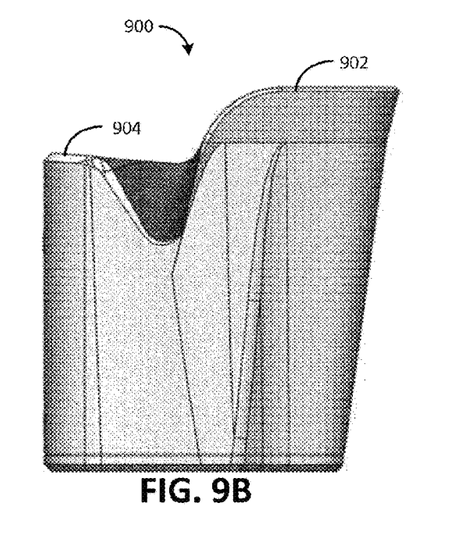
Figures 9C, 9D:
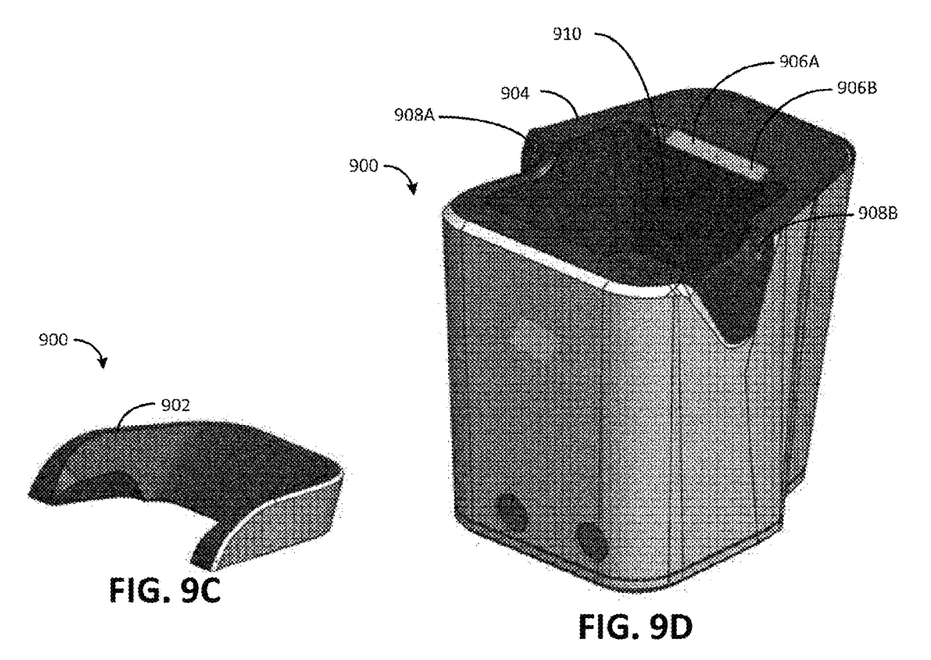

FIG. 8a is a front view of one embodiment of a non-contact capture device 800 illustrating a z-dimension of recess 815a and FIG. 8b is a side view of the non-contact capture device 800 of FIG. 6 with cut 830. As shown in FIG. 8a, recess 815a includes a z-dimension 817. z-dimension 817 may be a width of recess 815a. In some examples, the distance of z-dimension 817 may be in a range of 0.5 inches to 4 inches. z-dimension 817 of recess 815a is formed by a relationship between the collar and the body (either the "pillars" or the "pillar/guard" combined structure as is shown in figures of this disclosure). This relationship (a.k.a. a cut in the Z dimension) may provide a visual guide in the width dimension. The z-dimension of recess 815a may guide a user's hands in a vertical dimension and in the horizontal (side to side) dimension. FIG. 8b illustrates cut 830. Cut 830 may be a part of recess 815b. In some examples, cut 830 (a "U" shape) in the front guard may guide the user for finger capture for both hands. In some examples, non-contact capture device 800 may include indentation 832, as shown in FIG. 8b at the front side of non-contact capture device 800.

FIGS. 9A-9D illustrate perspective views of a non-contact capture device 900 with a detachable collar 902 and base 904. As shown in FIGS. 9A-9D, non-capture device 900 may include similar components and functionality as described in other examples of this disclosure. In some examples, collar 902 may be attached and detached to base 904 by one or more fasteners, such as hinges, rivets, tension fit couplings, magnetic couplings, or any other suitable fasteners. By removing collar 902 during a reader capture procedure to acquire an image of a user's palm, the user's palm may be more comfortably positioned over cavity 910 through which the image is captured.

In some examples, non-contact capture device 900 may include one or more indicator lights 908A-908B and/or indicator lights 906A-906B. Indicator lights 906A-906B and/or 908A-908B may be controlled by a combination of hardware/software included in base 904. In some examples, non-contact capture device 900 may cause one or more indicator lights to be activated according to a reader capture procedure. For instance, the reader capture procedure may be implemented in the combination of hardware/software in base 904. In some instances, the reader capture procedure may activate a first set of one or more of indicator lights 906, 908 when non-contact capture device 900 is ready to read a hand or portion of a hand. The reader capture procedure may activate a second set of one or more of indicator lights 906, 908 when capture device 900 has read the hand or portion of the hand. In some examples, the reader capture procedure may active a third set of one or more of indicator lights 906, 908 when the hand or portion of the hand should be removed from cavity 910 through which the hand or portion of the hand is read. In some examples, the indicator lights 906, 908 may indicate when collar 902 should be removed and/or reattached to base 904 during the reader capture procedure.

Although the methods and systems of the present disclosure have been described with reference to specific exemplary embodiments, those of ordinary skill in the art will readily appreciate that changes and modifications may be made thereto without departing from the spirit and scope of the present disclosure. The illustrated embodiments are not intended to be exhaustive of all embodiments according to the invention. It is to be understood that other embodiments may be utilized and structural or logical changes may be made without departing from the scope of the present invention. The detailed description, therefore, is not to be taken in a limiting sense, and the scope of the present invention is defined by the claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules.

The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device. The term "processor," or "controller" as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

The invention claimed is:

1. A non-contact capture device comprising:
   an electronic compartment comprising a camera and a light source, wherein the camera and light source are directed to an image capture region, and an infrared emitter and infrared sensor;
   a housing guide comprising a leg extending away from the electronic compartment to support a collar;
   an image capture region spaced away from the electronic compartment and the housing guide;
   wherein the collar extends laterally around only a portion of the image capture region forming an entry gap into the image capture region, includes a guide surface that extends in a plane that is co-planar with the image capture region, and a sloping surface that slopes down towards the plane defined by the guide surface and the image capture region; and
   wherein the infrared emitter emits infrared light from the electronic compartment into the image capture region and the infrared sensor detects reflections of the emitted infrared light.

2. The device of claim 1, wherein the housing guide comprises a first leg and a second leg, each on opposing portions of the electronic compartment.

3. The device of claim 2, wherein the housing guide further comprises a rear shield, extending from the electronic compartment to the collar and between the first leg and the second leg.

4. The device of claim 3, wherein the collar extends beyond the first leg and the second leg.

5. The device of claim 1, wherein the collar extends at least 90 degrees and less than 360 degrees circumferentially around the image capture region.

6. The device of claim 1, wherein the collar extends at least 180 degrees and less than 300 degrees circumferentially around the image capture region.

7. The device of claim 1, wherein the guide surface includes a color that is different than a color of the remaining portion of the collar.

8. The device of claim 1, further comprising an entry guard extending from the electronic compartment to below the image capture region.

9. The device of claim 1, further comprising a placement indicator comprising a sensor for detecting placement of an object to be imaged within the image capture region and an output for signaling correct placement of the object to be imaged within the image capture region.

10. The device of claim 9, wherein the output is a flashing colored light.

11. The device of claim 9, wherein the output is an audio signal.

12. The device of claim 9, wherein the output is an image icon.

13. The device of claim 1, further comprising an object to be imaged for placement into the image capture region.

14. The device of claim 13, wherein the object is one friction ridge surface of a user.

15. The device of claim 14, wherein the friction ridge is one of a finger pad, thumb, palm, or foot.

16. The device of claim 1, wherein when the infrared sensor detects the presence of an object, the infrared sensor triggers the light source and the camera.

17. The device of claim 16, wherein when the light source is triggered, the infrared sensor is deactivated.

18. The device of claim 17, wherein when the camera is triggered, the camera captures more than one image of an object in the image capture region.

19. The device of claim 1, further comprising a transparent surface disposed between the electronics compartment and the image capture region.

20. The device of claim 1, further comprising a second camera, wherein the first camera is positioned to capture an image of a first portion of an object to be imaged, and wherein the second camera is positioned to capture a second portion of the object to be imaged.

21. The device of claim 1, further comprising a communications module, wherein the communications module communicates with an exterior processor.

22. The device of claim 1, wherein the exterior processor triggers the light source and the camera.

23. The device of claim 1, wherein at least one of the housing guide or the collar includes a recess.

24. The device of claim 23, wherein the recess is semi-circle whereby the housing guide or collar becomes suitable for receiving a thumb into the image capture region while leaving other fingers outside of the image capture region or vice versa.

* * * * *